(No Model.)
H. SIEBEN.
GREASE TRAP FOR SINKS, BATHS, &c.
No. 599,663.                    Patented Feb. 22, 1898.
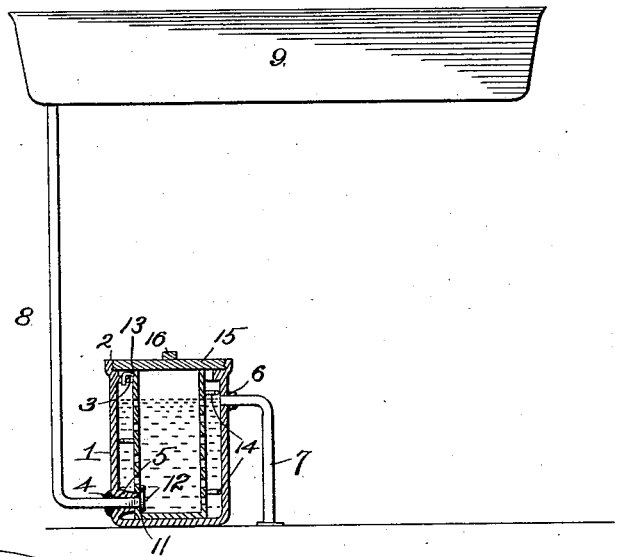
*Fig. 1.*
*Fig. 2.*
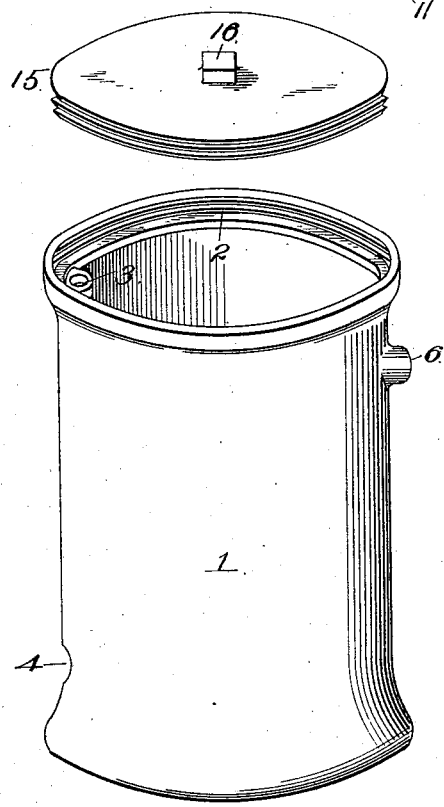
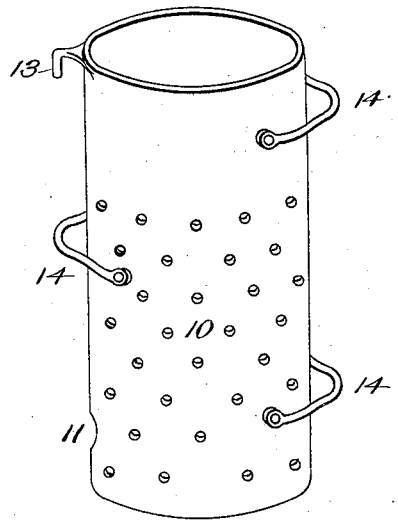
*Fig. 3.*
Witnesses:
F. G. Fischer
G. Y. Thorpe
Inventor
Henry Sieben
By Higdon & Higdon
Attys.
THE NORRIS PETERS CO., PHOTO-LITHO., WASHINGTON, D. C.

UNITED STATES PATENT OFFICE.

HENRY SIEBEN, OF KANSAS CITY, MISSOURI.

GREASE-TRAP FOR SINKS, BATHS, &c.

SPECIFICATION forming part of Letters Patent No. 599,663, dated February 22, 1898.

Application filed May 24, 1897. Serial No. 637,947. (No model.)

*To all whom it may concern:*

Be it known that I, HENRY SIEBEN, of Kansas City, Jackson county, Missouri, have invented certain new and useful Improvements in Grease-Traps for Sinks, Baths, &c., of which the following is a full, clear, and exact description, reference being had to the accompanying drawings, forming a part thereof.

My invention relates to grease-traps for sinks, bath-tubs, and the like; and it consists in certain novel and peculiar features of construction and combinations of parts, as will be hereinafter described and claimed.

The object of the invention is to produce a trap of this character which will thoroughly perform its function and which may be easily and expeditiously cleaned.

A further object of the invention is to produce a grease-trap which is simple, durable, and cheap of construction.

In order that the invention may be fully understood, I will proceed to describe it with reference to the accompanying drawings, in which—

Figure 1 represents, in side elevation, a sink provided with a grease-trap, shown in section, embodying my invention. Fig. 2 is a perspective view of the casing or shell of the trap and its detachable cover. Fig. 3 represents a perspective view of the removable perforate cylinder, forming the inner member of my improved grease-trap.

In the said drawings, 1 designates a cylinder of suitable size. It is open at its upper end and internally threaded, as shown at 2, and is provided with an apertured lug 3. Near its lower end it is provided or formed with an opening 4 and with an internal annular flange 5, surrounding said opening. Near its upper end it is preferably provided with an outwardly-projecting tubular extension 6, to which the drain-pipe 7 of the form shown or of any other suitable or preferred type is secured. The pipe 8, leading from the sink 9 or from a bath-tub or other receptacle, is fitted into the opening 4, and the joint is wiped by a plumber in the customary manner.

10 designates an inner cylinder which is finely perforated for about two-thirds of its height, more or less, in order to leave an imperforate upper portion for a purpose which will presently appear. Near its lower end it is provided with an opening 11, which registers with the flange 5 of the casing or shell, and closing said opening 11 at its inner side, when there is no water-pressure upon it, is a flap-valve 12 of any preferred construction. The upper end of the cylinder is provided with a hook 13, engaging the apertured lug 3 of the casing or shell, and in order to assist in maintaining said cylinder about in the center of the casing or shell I secure one or more guide springs or arms 14 thereto, which may be employed as handles, if desired, when inverting the cylinder to dump its contents.

15 designates a screw-cap to engage the threaded upper end of the cylinder or shell 1 and incidentally to close the upper end of the cylinder 10, and said cap is provided with a squared head or its equivalent, whereby it may be engaged by a wrench or by hand when it is desired to place it in or remove it from position.

In practice all the grease and other particles foreign to the water which pass down from the sink through the pipe 8 force the valve 12 open and enter the perforate cylinder. The grease of course floats and cakes upon the top of the water, while the heavier particles or scraps sink to the bottom. The grease and other foreign particles are retained in the perforated cylinder, while the water, clear of the same, escapes through the perforations of the cylinder, and when it reaches the level of the drain-pipe 7 escapes therethrough without danger or any possible chance, in fact, of stopping up said pipe. When the grease has accumulated sufficiently or at regular periods, the cap 15 may be unscrewed and removed and the perforated cylinder lifted out of the casing or shell 1. As it is elevated all of the water will drain through the perforations into the cylinder or shell, as will be readily understood. The perforated cylinder, now containing nothing but grease and other foreign particles or scraps, is emptied and may be scoured or cleaned in a very short time and replaced in position. The cap is then screwed down in place as before and the trap is again ready for operation. It is obvious by this arrangement that there is no possible chance of the drain-pipe being stopped up, and consequently expensive and frequent plumbing will be obviated.

The trap will be of further advantage in that any valuable which may be dropped into the tank, the bath, &c., will be caught and retained within the trap. The chief advantage, however, of course lies in the fact that the drain-pipe can never be choked up and that the perforated cylinder itself may always be kept in perfect working order with little loss of time or labor.

In many connections—such, for instance, as where no grease is conveyed into the trap—it may be found an advantage to perforate the cylinder 10 throughout its entire length, but when used in connection with an ordinary sink it is preferable to leave that portion projecting above the opening 6 of the casing or shell imperforate.

It is to be understood, of course, that various changes may be made in the form, proportion, and detail construction or organization of the parts without departing from the spirit and scope or sacrificing any of the advantages of the invention.

Having thus described the invention, what I claim as new, and desire to secure by Letters Patent, is—

In a grease-trap, the combination of a casing or shell provided with inlet and outlet openings, an apertured lug near its upper end, a cap or cover, and a circular flange 5 projecting radially from the inlet-opening, and a perforate cylinder within the casing and closed by its cap, provided with a hook engaging the apertured lug, external guard-arms engaging the internal surface of the cylinder, and a flap-valve normally closing an opening in the cylinder, and registering with the said circular flange, substantially as and for the purpose set forth.

In testimony whereof I affix my signature in the presence of two witnesses.

HENRY SIEBEN.

Witnesses:
M. R. REMLEY,
G. Y. THORPE.